INVENTOR
Russell R. Craft

May 25, 1948.   R. R. CRAFT   2,442,197
QUICK DEMOUNTABLE WHEEL
Filed April 8, 1946   3 Sheets-Sheet 3
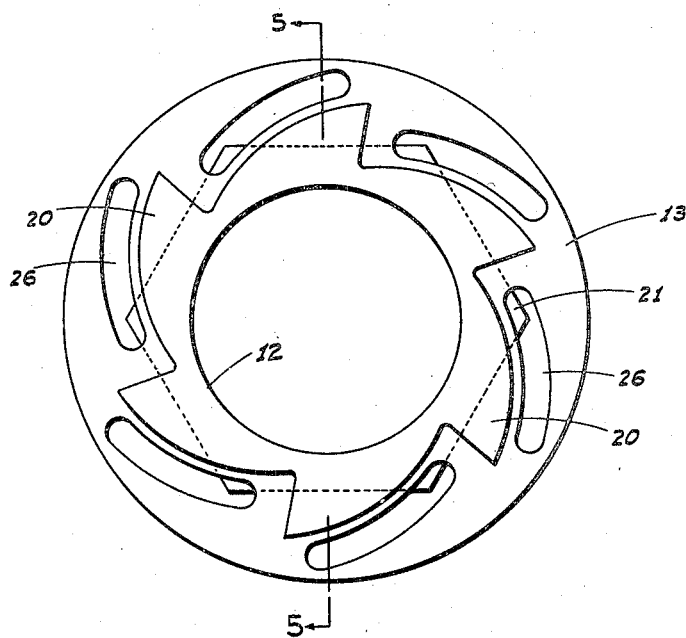
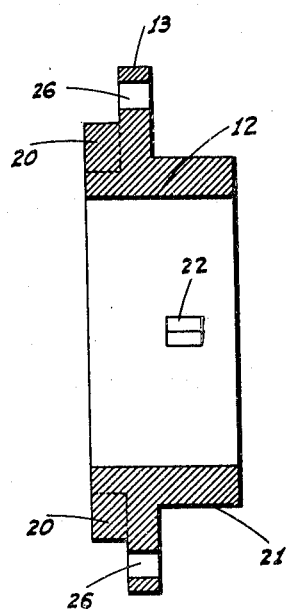
INVENTOR.
Russell R. Craft
BY
ATTYS Patented May 25, 1948

2,442,197

UNITED STATES PATENT OFFICE 2,442,197

QUICK DEMOUNTABLE WHEEL

Russell R. Craft, Boise, Idaho

Application April 8, 1946, Serial No. 660,556

5 Claims. (Cl. 301—9)

This invention is directed to, and it is an object to provide a quick demountable wheel for motor vehicles; such wheel being arranged so that it can be removed from, or replaced on, the wheel hub with a minimum of effort, readily, and without the use of any special tools.

Another object of the invention is to provide a quick demountable wheel which includes a novel cam actuated locking mechanism operative to normally and positively secure the wheel on the wheel hub; such mechanism including a key lock whereby to prevent wheel theft.

A further object of the invention is to provide a quick demountable wheel, as in the preceding paragraph, in which the wheel includes driving lugs projecting therefrom parallel to its axis and removably engaging in receiving openings in the disc of a heavy duty brake drum fixed on a separate wheel hub; the locking mechanism being arranged to forcefully urge the wheel toward the brake drum disc so as to normally but releasably maintain the lugs in said openings.

An additional object of the invention is to provide a quick demountable wheel which is simple, practical, rugged, foolproof, and exceedingly effective for the purposes designed.

These objects are accomplished by means of such structure and relative arrangement of parts as will fully appear by a perusal of the following specification and claims.

In the drawings:

Figure 4 is an elevation of the actuator sleeve detached, and looking at the back or inner face thereof.

Figure 5 is a diametral section on line 5—5 of Fig. 4.

Figure 1:
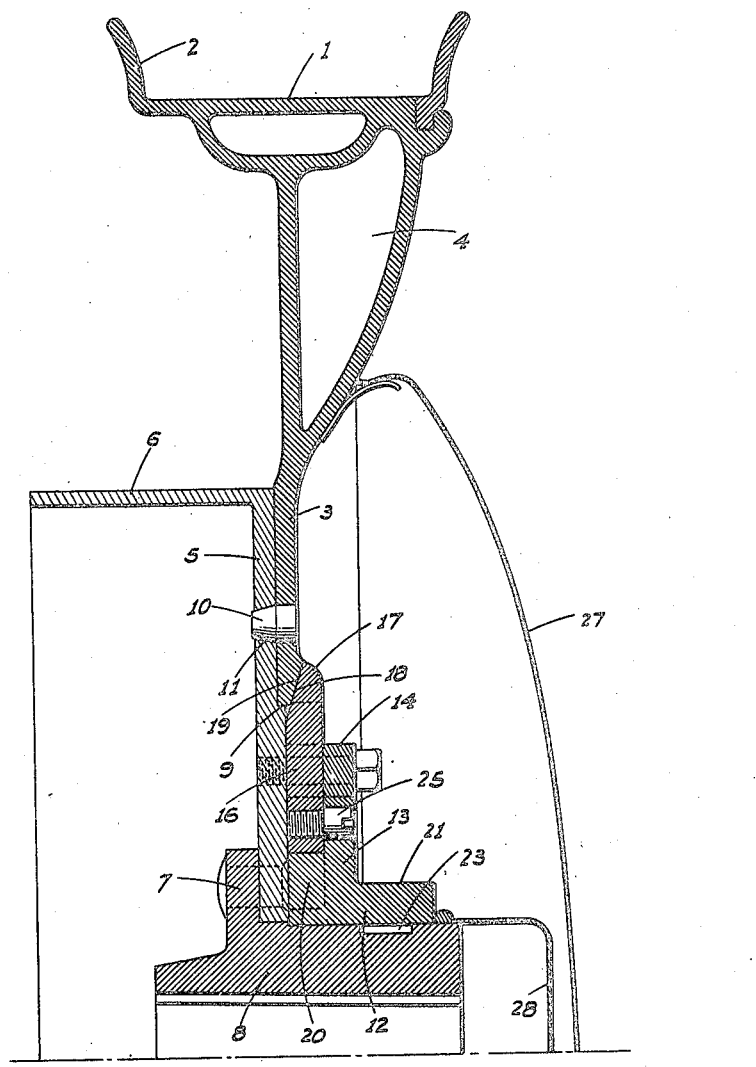
Figure 1 is a typical sectional elevation of the improved quick demountable wheel; the latter being in its normally locked position.

Referring now more particularly to the characters of reference on the drawings, the improved quick demountable wheel comprises a rim 1 having rim flanges 2; one of said flanges being removable for mounting of a tire (not shown) on said rim 1. The one of said rim flanges 2 which is removable may be key-locked, if desired, against unauthorized removal. The rim can be of flat type as shown, or drop center type.

The rim 1 is supported in integral relation by means of a circular disc type wheel 3 having a relatively large diameter central opening therein; such wheel being of the form shown in order to provide air pockets 4 directly inwardly of the rim 1. These air pockets prevent drumming of the wheels when traversing rough roads.

The radially inward portion of the wheel 3 normally abuts in matching face to face relation with the radially outward portion of the disc 5 of a heavy-duty brake drum 6, which brake drum disc 5 is fixed on an annular supporting flange 7 formed with a wheel hub 8. The wheel hub 8 is of course separate from the wheel 3, and when said wheel 3 is in place on the brake drum 6 it bears against an annular shoulder 9.

The wheel 3 has a plurality of circumferentially spaced driving lugs 10 fixed thereon in concentric relation to said wheel, and the driving lugs 10 normally engage in receiving openings 11 in the disc 5 of the brake drum 6.

The wheel 3 is normally maintained in engagement with the disc 5, with the lugs 10 seated in openings 11, by means of a releasable locking mechanism, which locking mechanism comprises the following:

An actuator sleeve 12 is rotatably, but axially immovably, mounted on the hub 8 on the side of the brake drum disc 5 opposite the supporting flange 7; said actuator sleeve including, intermediate its ends, an annular radially outwardly projecting flange 13. A retaining ring 14 closely surrounds the flange 13 and is of such a depth that it abuts against the adjacent face of the disc 5. The ring 14 inwardly of the flange 13 is formed with a plurality of evenly circumferentially spaced radial guide slots 15, through which the legs 16 of substantially T-shaped locking dogs 17 slidably project in guided relation.

Figure 2:
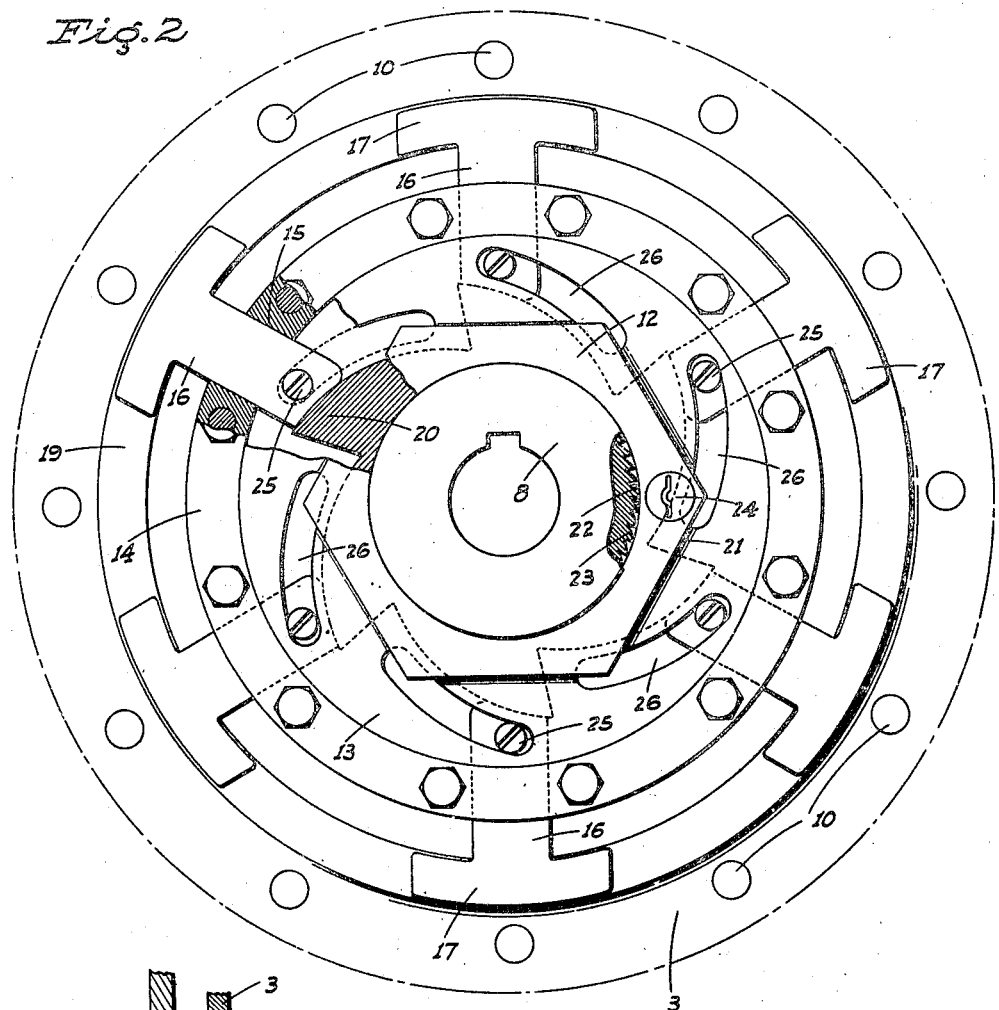
Figure 2 is a front elevation showing mainly the locking mechanism; such view being partly broken away.

The locking dogs are normally radially advanced, as shown in Figs. 1 and 2, by cam means hereinafter described, and as so advanced the dogs 17 lock the wheel 3 and lugs 10 against escape from the brake drum disc 5; such locking being accomplished through the medium of axially outwardly tapered faces 18 on the dogs which engage—in wedging relation—with an axially inwardly tapered annular face 19 on the circular wheel 3 at its inner periphery. As soon as the dogs 17 are radially advanced, the wheel 3 is thus locked against separation from the brake drum disc 5.

The outer or cross leg portion of each dog, which is formed with the tapered face 18, is of course formed concentric to the annular face 19.

The locking dogs 17 are radially advanced by corresponding cams 20 formed on the actuator sleeve 12 to the rear of the flange 13, and each such dog bears, at its inner end, against the corresponding cam, in the manner clearly shown in Fig. 2.

The outer end portion of the actuator sleeve 12 is formed as a hexagonal nut 21 adapted for engagement by a wrench whereby the actuator sleeve 12 can be rotated so that the cams 20 turn in a direction to advance the dogs 17. When the dogs are advanced into wheel locking position, the actuator sleeve 12 is thereafter releasably locked against rotation in a direction which would permit of retraction of said cams; such locking being accomplished through the medium of a spring-pressed, toothed, locking plunger 22 mounted in the actuator sleeve 12 and adapted to cooperate with a row of locking serrations 23 on hub 8. The locking plunger 22 is releasable from the locking serrations 23 by means of a key lock 24. Thus, the actuator sleeve 12 can be unlocked and operated only by an authorized person in possession of the key for lock 24. Also the key lock 24 serves as a safety device to prevent vibratory release of the wheel securing mechanism, especially when rough roads are traversed.

When it is desired to demount the wheel the lock 24 is unlocked so as to withdraw the locking plunger 22, whereupon the actuator sleeve 12 can be rotated so that the cams 20 move in a direction to permit retraction of the dogs 17; such retraction then being caused by roller pins 25 on said dogs, which run in cam slots 26 in the flange 13 concentric and corresponding to the cams 20.

Figure 3:
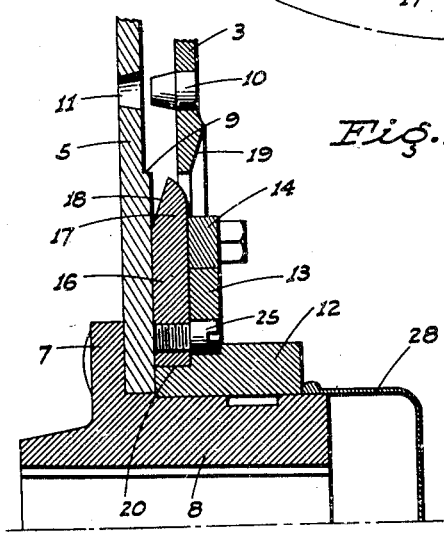
Figure 3 is a fragmentary sectional elevation showing the locking mechanism in its retracted position and the wheel being removed.

When the dogs 17 are retracted by rotation of the actuator sleeve 12, as above, the faces 18 of said dogs move radially inwardly away from the annular face 19, as clearly shown in Fig. 3, whereupon the wheel 3 may be withdrawn from the brake drum disc 5.

To replace the wheel 3, the above described operation is merely reversed.

The locking mechanism is normally protected by a removable hub cap 27, while the hub 8 includes the usual bearing protecting cap 28 on its outer end, but within the hub cap 27.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. A quick demountable wheel assembly comprising a wheel having a central opening, a separate wheel hub in said central opening having a radial disc thereon, the wheel and disc normally engaging in face to face relation, driving connections between the wheel and disc disengageable upon axial separation of the wheel from the disc, and a quick releasable locking mechanism supported by the hub and disc arranged to engage the wheel and normally prevent such axial separation thereof; said locking mechanism including a plurality of radial, circumferentially spaced locking dogs normally positively advanced and engaging the wheel on the side opposite said disc, and means to positively advance or retract said dogs, said dogs being T-shaped, the wheel having an annular face thereon for engagement by the heads of said dogs, and said heads being concentric to said face, said heads and face having complementary tapered surfaces so that when the latter are positively engaged the wheel is wedged toward the disc.

2. A quick demountable wheel assembly comprising a wheel having a central opening, a separate wheel hub in said central opening having a radial disc thereon, the wheel and disc normally engaging in face to face relation, driving connections between the wheel and disc disengageable upon axial separation of the wheel from the disc, an actuator sleeve rotatably mounted on the hub, said sleeve being formed for rotation by a tool, an annular, radial flange on the actuator sleeve in spaced relation to the disc, a plurality of circumferentially spaced cams formed on the sleeve between said flange and the disc, and a plurality of radial circumferentially spaced dogs slidably guided between the flange and disc and riding said cams whereby rotation of the sleeve in one direction causes the dogs to advance, the dogs when advanced positively engaging the wheel in a manner to prevent such axial separation thereof.

3. A quick demountable wheel assembly comprising a wheel having a central opening, a separate wheel hub in said central opening having a radial disc thereon, the wheel and disc normally engaging in face to face relation, driving connections between the wheel and disc disengageable upon axial separation of the wheel from the disc, an actuator sleeve rotatably mounted on the hub, said sleeve being formed for rotation by a tool, an annular, radial flange on the actuator sleeve in spaced relation to the disc, a plurality of circumferentially spaced cams formed on the sleeve between said flange and the disc, and a plurality of radial, circumferentially spaced dogs slidably guided between the flange and disc and riding said cams whereby rotation of the sleeve in one direction causes the dogs to advance, the dogs when advanced positively engaging the wheel in a manner to prevent such axial separation thereof; there being means operative to retract the dogs upon rotation of the sleeve in the opposite direction.

4. A quick demountable wheel assembly as in claim 3 in which said last named means comprises laterally projecting cam pins on the dogs, the adjacent flange having cam slots therein corresponding and concentric to the cams.

5. A quick demountable wheel assembly comprising a wheel having a central opening, a separate wheel hub in said central opening having a radial disc thereon, the wheel and disc normally engaging in face to face relation, driving connections between the wheel and disc disengageable upon axial separation of the wheel from the disc, an actuator sleeve rotatably mounted on the hub, said sleeve being formed for rotation by a tool, an annular, radial flange on the actuator sleeve in spaced relation to the disc, a plurality of circumferentially spaced cams formed on the sleeve between said flange and the disc, and a plurality of radial circumferentially spaced dogs slidably guided between the flange and disc and riding said cams whereby rotation of the sleeve in one direction causes the dogs to advance, the dogs when advanced positively engaging the wheel in a manner to prevent such axial separation thereof; there being a ring closely surrounding the flange and secured in abutting relation to the disc radially out from the cams, said ring being radially slotted to form guides for the dogs.

RUSSELL R. CRAFT.

REFERENCES CITED

The following references are of record in the file of this patent:

UNITED STATES PATENTS

| Number | Name | Date |
|---|---|---|
| 1,375,037 | De La Barre | Apr. 19, 1921 |
| 1,707,485 | Clench | Apr. 2, 1929 |
| 2,001,242 | Dodge | May 14, 1935 |
| 2,023,352 | Backe | Dec. 3, 1935 |
| 2,029,866 | Haberl | Feb. 4, 1936 |
| 2,043,123 | Slick | June 2, 1936 |
| 2,272,575 | Organ | Feb. 10, 1942 |
| 2,289,448 | Monroe | July 14, 1942 |

FOREIGN PATENTS

| Number | Country | Date |
|---|---|---|
| 22,635 | Great Britain | 1913 |